United States Patent [19]

Ficken

[11] 4,009,607
[45] Mar. 1, 1977

[54] FORCE MEASURING SYSTEM INCLUDING COMBINED ELECTROSTATIC SENSING AND TORQUING MEANS

[75] Inventor: William H. Ficken, Berkeley Heights, N.J.

[73] Assignee: The Bendix Corporation, Teterboro, N.J.

[22] Filed: Dec. 24, 1975

[21] Appl. No.: 644,218

[52] U.S. Cl. .............................. 73/141 R; 73/517 B
[51] Int. Cl.² ...................... G01L 1/08; G01L 1/14; G01P 15/08
[58] Field of Search ......... 73/517 B, 141 R, 516 R; 308/10; 318/676

[56] References Cited
UNITED STATES PATENTS

| | | | |
|---|---|---|---|
| 2,316,915 | 4/1943 | Truman | 73/517 B X |
| 2,966,802 | 1/1961 | Steen | 73/516 R |
| 3,151,486 | 10/1964 | Plummer | 73/517 B |
| 3,229,530 | 1/1966 | Wilcox et al. | 73/517 B |
| 3,417,626 | 12/1968 | Riordan | 73/516 R |

Primary Examiner—James J. Gill
Attorney, Agent, or Firm—Anthony F. Cuoco

[57] ABSTRACT

A force measuring system includes a signal source for energizing a capacitance bridge arrangement. The bridge arrangement includes a pair of fixed capacitors and a pair of variable capacitors formed by a displaceable force sensitive element normally disposed in a null position between two fixed plates. A force applied to the system displaces the force sensitive element from the null position toward one or the other of the fixed plates to unbalance the bridge whereupon a signal is provided which is applied to a servo amplifier. The servo amplifier provides a signal which is applied to the displaceable force sensitive element, and which element is restored to the null position due to the electrostatic reaction occurring upon appropriate energization of the fixed plates. The signal provided by the servo amplifier is an accurate measure of the sensed force.

4 Claims, 3 Drawing Figures

FORCE MEASURING SYSTEM INCLUDING COMBINED ELECTROSTATIC SENSING AND TORQUING MEANS

BACKGROUND OF THE INVENTION

1. Field of the Invention

This invention relates generally to force measuring systems and particularly to force balance type systems for measuring a sensed force. More particularly, this invention relates to systems of the type described having combined electrostatic force sensing and force balancing means.

2. Description of the Prior Art

Commonly assigned U.S. application Ser. No. 585,451 filed on June 12, 1975 by John Calamera and Michael J. Lanni discloses a force measuring system including a signal source for energizing a capacitance bridge arrangement. The bridge arrangement includes a pair of fixed capacitors and a pair of variable capacitors formed by a displaceable force sensitive element normally disposed in a null position between two fixed plates. A force applied to the system displaces the force sensitive element from the null position toward one or the other of the fixed plates to unbalance the bridge whereupon a current is provided for energizing a torquer coil which provides a torque for restoring the force sensitive element to the null position. The torquer current is a measure of the applied force. In devices of this type the torque is generated electromagnetically and independent of the force sensing function, whereby the devices require additional hardware and suffer attendant inaccuracies. The present invention overcomes these disadvantages by electrostatically providing both the torquing and sensing functions with essentially the same hardware, and is thus a distinct improvement in the art in that a simple and accurate force measuring system is provided.

SUMMARY OF THE INVENTION

This invention contemplates a force sensing system including a signal source for providing a signal which energizes a capacitance bridge arrangement. The capacitance bridge arrangement includes a pair of fixed capacitors and a pair of variable capacitors formed by a force sensitive element normally disposed in a null position between two fixed plates. A force, which may be acceleration for purposes of illustration, causes the force sensitive element to be displaced away from the null position toward one or the other of the fixed plates depending on the direction of the force, whereupon the bridge becomes unbalanced and provides an error signal. The error signal is detected and applied through a servo amplifier to the force sensitive element. The force sensitive element is thereby energized and electrostatically reacts with the fixed plates upon energization of said plates, whereby the electrostatic reaction restores the force sensitive element to the null position.

One object of this invention is to provide a force measuring system of the type including a capacitance bridge arrangement having a pair of fixed capacitors and a pair of variable capacitors formed by a force sensitive element normally disposed in a null position between two fixed plates, and wherein a force displaces the force sensitive element from the null position toward one or the other of the fixed plates to unbalance the bridge and to provide an error signal which is a measure of the sensed force, said measurement being provided more simply and accurately than has heretofore been possible.

Another object of this invention is to utilize the error signal to provide an electrostatic reaction for restoring the force sensitive element to the null position, and thereby eliminating electromagnetic restoring means which have been heretofore required.

Another object of this invention is to combine the force sensing and restoring means to minimize the hardware required and to provide a system of the type described having the aforenoted increased simplicity and accuracy.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
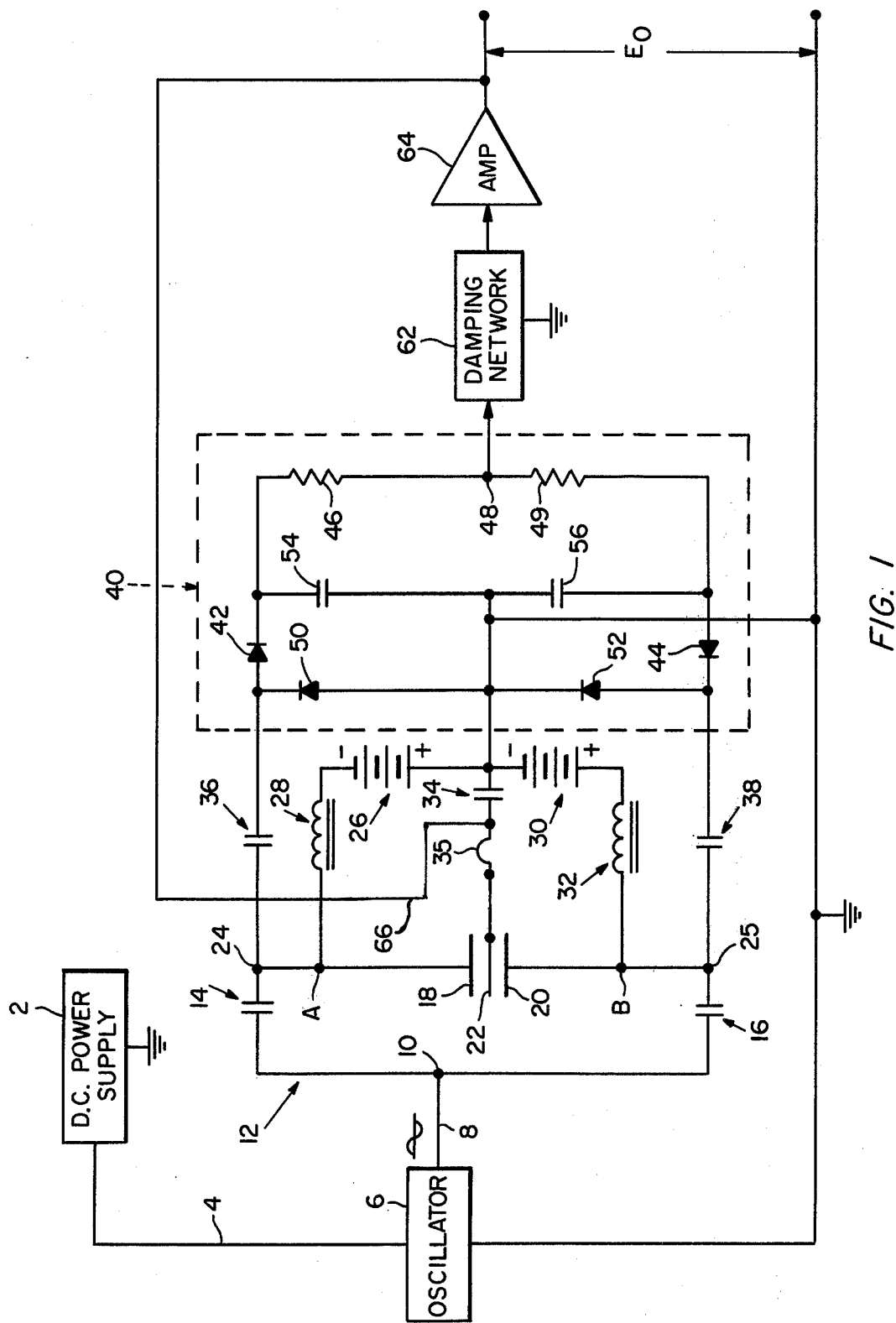
FIG. 1 is an electrical schematic diagram showing a force measuring system according to the invention.

With reference first to FIG. 1, a d.c. power supply designated by the numeral 2 is connected through a conductor 4 to an oscillator 6. Oscillator 6 may be a conventional Collpitts type oscillator such as that described in *Basic Theory and Application of Transistors* (TM11-69) Department of the Army, March 1959, pages 171 and 172, and which oscillator provides a high frequency alternating signal at an output conductor 8 thereof.

The alternating signal at output conductor 8 is applied to an input terminal 10 of an electrical bridge arrangement designated generally by the numeral 12. Bridge 12 includes a pair of fixed capacitors 14 and 16 and a pair of variable capacitors formed by a fixed plate 18 and a fixed plate 20, with a force sensitive element 22 disposed therebetween and normally in a null position. Fixed plate 18 is connected to capacitor 14 and fixed plate 20 is connected to capacitor 16.

Figure 2:
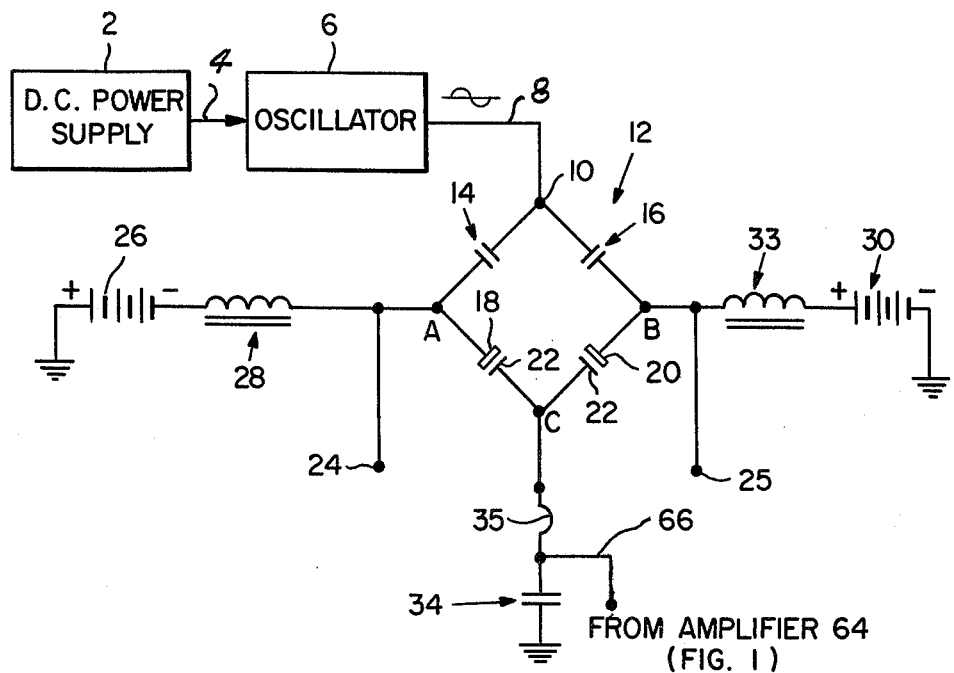
FIG. 2 is a combined block diagram-electrical schematic showing in equivalent form a capacitance bridge arrangement according to the invention.

Bridge configuration 12 is shown in equivalent form in FIG. 2. Thus, d.c. power supply 2 energizes oscillator 6 with the a.c. signal therefrom being applied to input terminal 10 of bridge 30. When no force is applied to the system of the invention as is the case under zero G acceleration conditions, element 22 remains in the nulll position and bridge 12 will be in a balanced state. Upon acceleration or some other force being applied, element 22 will be displaced toward fixed plate 18 or 20, depending on the sense or direction of the force as the case may be, to unbalance bridge 12 whereupon a differential or error a.c. signal will appear across bridge points A and B, and hence across bridge output terminals 24 and 25.

With reference now to FIGS. 1 and 2, a battery 26 has a grounded positive terminal and a negative terminal connected to an inductor 28, and which inductor 28 is connected to bridge point A. A battery 30 has a grounded negative terminal and a positive terminal connected through an inductor 32 to bridge point B. The purpose of batteries 26 and 30 and the respective inductors 28 and 32 connected in the configuration as shown will be hereinafter explained. Bridge point C is connected to a capacitor 34 through a hairspring or flex lead 35, and which capacitor is connected to ground.

With further reference to FIG. 1, coupling capacitors 36 and 38 are connected to capacitors 14 and 16, respectively, and which capacitors are connected to a detector circuit designated generally by the numeral 40. Detector circuit 40 includes a diode 42 having an anode connected to capacitor 36 and a diode 44 having a cathode connected to capacitor 38. Diode 42 has a cathode connected through a resistor 46 to a circuit point 48 and diode 44 has an anode connected through a resistor 49 to circuit point 48.

A diode 50 has a cathode connected intermediate capacitor 36 and diode 42 and an anode connected to ground, and a diode 52 has an anode connected intermediate capacitor 38 and diode 44 and a cathode connected to ground. A capacitor 54 is connected to the cathode of diode 42 and is connected to ground and a capacitor 56 is connected to the anode of diode 44 and is connected to ground.

Thus, the differential or a.c. error signal across bridge points A and B is detected by detector 40 and which detector 40 provides at circuit point 48 a d.c. error signal corresponding in polarity and magnitude to the displacement of displaceable plate 22 from the null position. This d.c. error signal is applied to a conventional filter or damping network 62 and therefrom to a servo amplifier 64. Servo amplifier 64 provides a signal $E_0$ which is applied through a conductor or lead 66 to circuit point C, and which signal is a measure of the applied force.

Battery 26 which provides a negative d.c. signal is connected through inductor 28 to circuit point A, whereby fixed plate 18 is charged in a negative sense, and battery 30 which provides a positive d.c. signal is connected through inductor 32 to circuit point B whereby fixed plate 20 is charged in a positive sense. Inductors 28 and 32 serve as chokes to pass the aforenoted d.c. signals to the fixed plates while isolating the respective batteries from the high frequency a.c. signal from oscillator 6.

Figure 3:
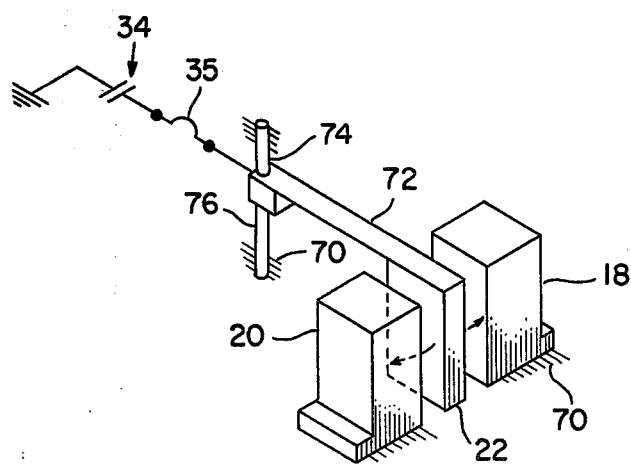
FIG. 3 is an isometric pictorial representation showing the structural arrangement of the elements of a force measuring system according to the invention.

With reference now to FIG. 3 the structural relationship of fixed capacitor plates 18 and 20 and displaceable force sensitive element 22 is shown in a typical force measuring system. Thus, fixed plates 18 and 20 are suitably mounted to a force sensing instrument or accelerometer case 70. Displaceable element 22 is supported on an arm or beam 72 which is journaled in case 70 through pivots 74 and 76 so that displaceable plate 22 may be angularly displaced relative to fixed plates 18 and 20 in response to an applied force. Beam 72 is connected through flex lead or hairspring 35 to capacitor 34, and which capacitor 34 is connected to ground as heretofore described with reference to FIGS. 1 and 2.

OPERATION OF THE INVENTION

Normally, force sensitive element 22 is equally spaced between fixed plates 18 and 20 as shown in FIG. 3 to effect a null condition as heretofore noted. In operation, a force displaces element 22 toward one or the other of the plates depending upon the direction of the force to disturb the null condition and to cause the aforenoted unbalanced capacitance bridge condition.

The unbalanced bridge condition causes an error signal at circuit point 48 (FIG. 1) and which error signal is either positive or negative depending on the direction of displacement of element 22. The error signal is applied through damping network 62 to amplifier 64. Amplifier 64 provides restoring signal $E_0$ which is applied to displaceable plate 22. Since fixed plates 18 and 20 are energized with negative and positive d.c. voltages respectively, an electrostatic restoring force is generated which displaces displaceable element 22 to its original or null position.

The electrostatic restoring force thus generated is in accordance with the following equation, reference being had to the textbook, *Elements of Electricity* by Timbie, Fourth Edition published by John Wiley & Sons, Page 396:

$$F = \frac{1.59 \, KAE^2}{l^2 \cdot 10^{11}},$$

where F is the force in ounces, K is the capacitor dielectric constant, A is the area of displaceable plate 22 in square inches, E is the difference in magnitude between the signal applied to fixed plates 18 and 20 and signal $E_0$ applied to moveable plate 22 and $l$ is the gap between the displaceable plate and the fixed plate toward which it is displaced in inches.

A restoring torque is provided which is determined as the product of the force as calculated above times the moment arm as is well known in the art.

Thus, there has been disclosed a force sensing device including combined electrostatic sensing and restoring force means. A device of this type is advantageous in that no additional structure is required to generate the restoring force as has been necessary in prior art devices. Since the restoring force is provided in an electrostatic manner it is independent of any stray magnetic forces which are likely to occur and provides a simplified, mechanically and electrically economical and reliable device.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A force measuring system, comprising: a signal source for providing a relatively high frequency alternating signal;
   a capacitance bridge arrangement connected to the signal source and energized by the high frequency alternating signal therefrom, and including a pair of fixed capacitors and a pair of variable capacitors formed by a displaceable force sensitive element displaceably mounted to a case and disposed between two plates fixed to the case, the force sensitive element normally in a null position relative to the fixed plates for providing a balanced bridge condition;
   the displaceable force sensitive element being displaced by an applied force toward one of the fixed plates for providing an unbalanced bridge condition;

means responsive to the unbalanced bridge condition for providing an error signal;

the displaceable force sensitive element connected to the error signal means and energized by the signal therefrom;

means for connecting the displaceable force sensitive element to ground;

means for providing constant level signals for energizing the two fixed plates;

means connected between the means for providing the constant level signals and the two fixed plates for isolating the constant level signals from the high frequency alternating signal; and an electrostatic reaction between the energized displaceable force sensitive element and the energized fixed plates providing a restoring force for restoring the force sensitive element to the null position, the restoring force being a measure of the applied force.

2. A force measuring system as described by claim 1, wherein:

the error signal has a sense in accordance with the direction of displacement of the displaceable force sensitive element, and the element is energized by the error signal in said sense;

the means for providing constant level signals for energizing the two fixed plates includes first means for providing a signal for energizing one of the two plates in one sense and second means for providing a signal for energizing the other of the two plates in an opposite sense; and the electrostatic reaction between the energized displaceable force sensitive element and the energized fixed plates providing a restoring force for displacing the element toward the fixed plate energized in a sense opposite to the sense of the energization of said element.

3. A force measuring system as described by claim 2, wherein the isolating means includes:

first isolating means connected between the first energizing signal means and the one plate for isolating said first energizing signal means from the high frequency alternating signal, and second isolating means connected between the second energizing signal means and the other plate for isolating said second energizing signal means from the high frequency alternating signal.

4. A force measuring system as described by claim 1, including:

a beam displaceably mounted to the case;

an element carried by the beam at one end thereof and disposed between the two fixed plates;

the beam and element combining to provide the force sensitive element; and the means connecting the force sensitive element to ground including a capacitor.

* * * * *